United States Patent
Pathak et al.

(10) Patent No.: US 11,651,376 B2
(45) Date of Patent: May 16, 2023

(54) SMART GLASSES BASED DETECTION OF ATM FRAUD

(71) Applicant: Bank of America Corporation, Charlotte, NC (US)

(72) Inventors: Nikhil Pathak, Uttar Pradesh (IN); Vinod Maghnani, Haryana (IN); Saisrikanth Chitty, Telangana (IN); Mukesh Katare, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/382,495

(22) Filed: Jul. 22, 2021

(65) Prior Publication Data

US 2023/0028010 A1    Jan. 26, 2023

(51) Int. Cl.
*G06Q 20/40* (2012.01)
*G06Q 20/10* (2012.01)

(52) U.S. Cl.
CPC ..... *G06Q 20/4016* (2013.01); *G06Q 20/1085* (2013.01)

(58) Field of Classification Search
None
See application file for complete search history.

(56) References Cited

U.S. PATENT DOCUMENTS

| | | | |
|---|---|---|---|
| 7,946,474 B1 | 5/2011 | Agrawal | |
| 9,911,073 B1 * | 3/2018 | Spiegel | G06T 7/33 |
| 10,157,332 B1 * | 12/2018 | Gray | G06T 11/00 |
| 10,936,650 B2 * | 3/2021 | Grandhi | G06F 16/434 |
| 10,944,898 B1 * | 3/2021 | Farivar | H04N 23/64 |
| 11,361,373 B1 * | 6/2022 | Warren | G06F 16/9535 |
| 2015/0032527 A1 * | 1/2015 | Hunt | G06Q 30/0256 705/14.54 |
| 2015/0213427 A1 * | 7/2015 | Hodges | G07F 19/2055 705/18 |
| 2016/0125879 A1 * | 5/2016 | Lovitt | G10L 15/22 704/275 |

(Continued)

FOREIGN PATENT DOCUMENTS

JP    2013-191037    9/2013

OTHER PUBLICATIONS

"Hawra Alsaid et al., Deep Learning Assisted Smart Glasses as Educational Aid for Visually Challenged Students, College of Computer Engineering and Sciences, Dec. 2019" (Year: 2019).*

*Primary Examiner* — Kito R Robinson
*Assistant Examiner* — Toan Duc Bui
(74) *Attorney, Agent, or Firm* — Weiss & Arons LLP

(57) ABSTRACT

Systems, methods, and apparatus are provided for fraud screening via smart glasses interactions during an ATM session. A smart glasses device may capture an image of an ATM environment. The ATM and the smart glasses device may be edge nodes on an edge network. An edge platform may use a fraud detection model to classify the image and compare it to stored ATM images. The model may be trained at an enterprise server and stored on the edge platform. In response to a determination of fraud at the edge platform, a fraud alert may be transmitted to the smart glasses device during the ATM session. Edge computing reduces latency to enable real-time smart glasses alerts. The smart glasses device may communicate the fraud alert to other smart glasses devices on the edge network.

18 Claims, 6 Drawing Sheets

(56) References Cited

U.S. PATENT DOCUMENTS

| | | | |
|---|---|---|---|
| 2017/0053441 A1* | 2/2017 | Nadumane | G06Q 50/163 |
| 2017/0161747 A1* | 6/2017 | Einhorn | G06Q 20/322 |
| 2017/0270494 A1* | 9/2017 | Nayak | H04W 4/12 |
| 2019/0122045 A1* | 4/2019 | Ravi | H04L 67/306 |
| 2019/0332694 A1* | 10/2019 | Tcherechansky | G06F 16/634 |

* cited by examiner

SMART GLASSES BASED DETECTION OF ATM FRAUD

FIELD OF TECHNOLOGY

Aspects of the disclosure relate to detecting ATM fraud using smart glasses technology.

BACKGROUND OF THE DISCLOSURE

Annual losses from electronic crime associated with automated teller machine (ATM) use may reach billions of dollars. One prevalent form of ATM tampering is the practice of "skimming." Skimming typically involves modifying an ATM to capture information associated with a user access card. For example, a card reader device may be inserted over or within the original ATM card reader, a hidden camera may capture PIN entries, or a keypad overlay may capture keypad strokes. Because these modifications appear to be legitimate components of the ATM, skimming often goes undetected by users.

Smart glasses may be defined as wearable glasses that include both hardware and software components. Smart glasses may adopt the structure of a conventional pair of eyeglasses with a frame and lenses. A microprocessor may be embedded within the glasses and may provide processing capabilities.

It would be desirable to leverage smart glasses capabilities for detection of fraud at an ATM. It would be desirable to use edge computing architecture to reduce latency and provide real-time fraud updates at a smart glasses interface.

SUMMARY OF THE DISCLOSURE

Systems, methods, and apparatus for smart glasses based detection of ATM fraud are provided.

Data from an ATM and may be stored in an ATM profile. The ATM profile may include transaction data, fraud data and ATM image data. The ATM profile data may be stored at an edge computing node. Updated profile data may be transmitted to enterprise systems at periodic intervals.

A smart glasses user may initiate an ATM session via a smart glasses device. The smart glasses device may be authenticated to the edge network. Following authentication, the smart glasses device may capture an image of the ATM environment and transmit the image to the edge computing platform.

Machine learning algorithms may classify the smart glasses image based on the image attributes and compare the image attributes to data from the ATM profile. A fraud detection model generated at an enterprise system and stored at the edge computing platform may incorporate the ATM profile data.

When the probability of correspondence between the image attributes from the smart glasses image and the ATM profile data meets or exceeds a predetermined threshold, the edge computing platform may transmit an all-clear message to the smart glasses device.

When the probability of correspondence between the image attributes from the smart glasses image and the ATM profile does not meet the predetermined threshold, the edge platform may transmit a fraud alert to the smart glasses device. The edge computing platform may transmit instructions to the ATM to disable one or more ATM functions.

The edge computing platform or the smart glasses device may communicate the fraud alert to other smart glasses devices on the edge network.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
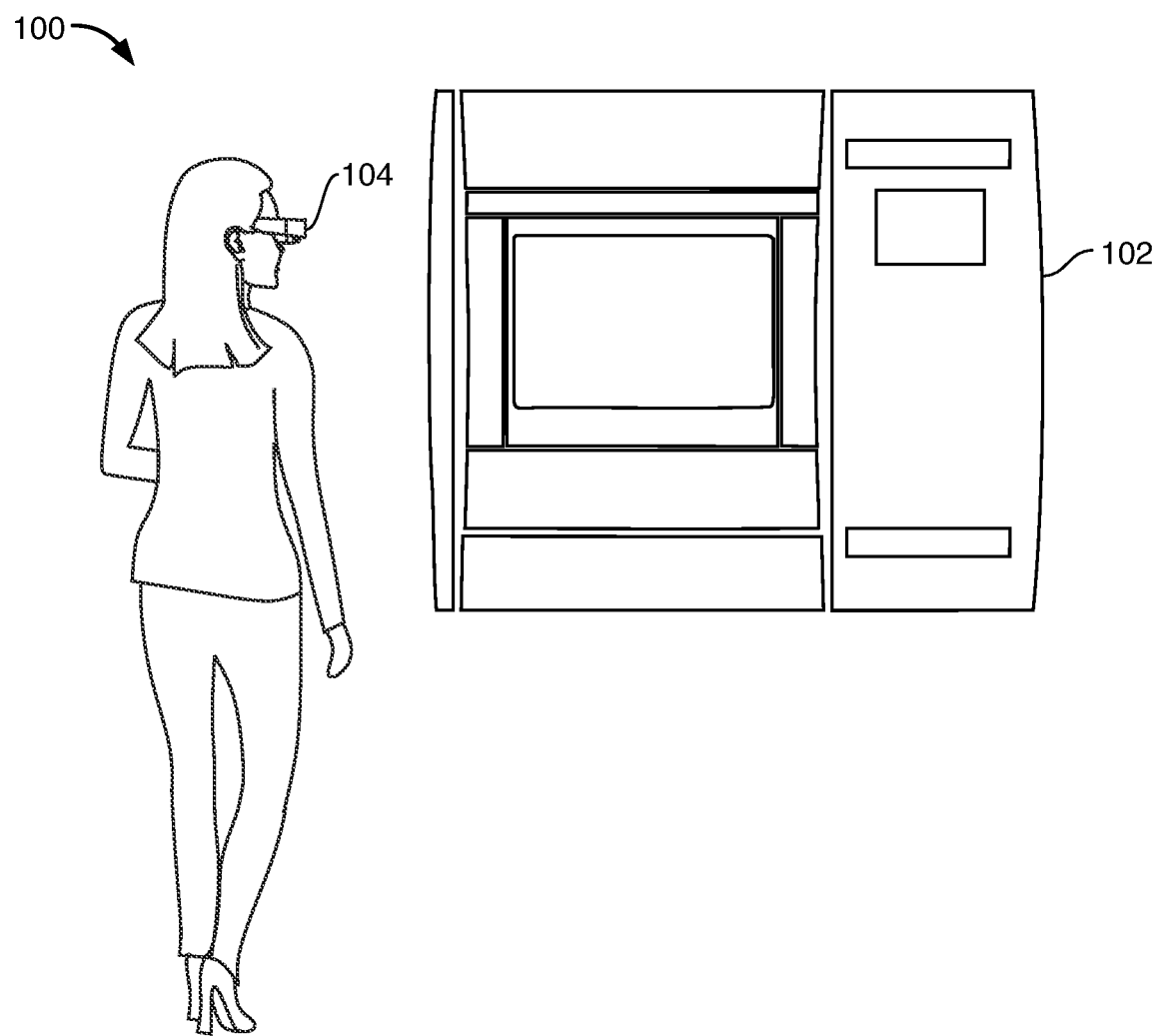
FIG. 1 shows illustrative apparatus and a scenario in accordance with principles of the disclosure.

Systems, methods and apparatus for smart glasses based ATM fraud detection are provided.

Self-service kiosks such as an automated teller machine (ATM) improve accessibility and efficiency for financial transactions. However, the autonomous nature of such kiosks may leave them vulnerable to tampering. A bad actor may modify the physical environment to skim access information in a way that is undetectable by the user.

It would be desirable to provide smart glasses based capabilities for identifying tampering or other types of fraud at a self-service kiosk such as an ATM. It would be desirable to reduce latency via edge processing so that mitigation measures may be taken within a live ATM session before the user begins a transaction.

For the sake of illustration, the invention will be described as being performed by a "system." The system may include one or more features of apparatus and methods that are described herein and/or any other suitable device or approach.

The system may include wearable smart glasses. The smart glasses may be structured with a frame and lenses. The frame and/or lenses may include embedded or partially embedded hardware and software components.

The smart glasses may include one or more microprocessors. The smart glasses may include one or more software applications. The applications may enable the smart glasses to execute various tasks. One or more of the software applications may be executed on the processors. Software applications may be stored in a memory embedded in the smart glasses.

The smart glasses may include one or more displays. In some embodiments, a smart glasses display may add data alongside the view through the lenses using augmented reality technology. A display controller may be configured to display data as a semi-transparent overlay appearing on the lenses. Augmented reality displays may be achieved through curved mirror techniques. Alternative techniques include waveguide-based technology such as a virtual retinal display.

The smart glasses may include one or more communication transceivers. The communication transceivers may be operable to communicate with an external processor. The external processor may be located within a mobile device or any other suitable computing device.

The smart glasses may include a nano wireless network interface card ("NIC"). The nano wireless NIC may provide the smart glasses with a dedicated, full-time connection to a wireless network. The nano wireless NIC may implement the physical layer circuitry necessary for communicating with a data link layer standard, such as Wi-Fi. The nano wireless NIC may support input/output ("I/O"), interrupt, direct memory access, interfaces, data transmission, network traffic engineering and/or partitioning.

The smart glasses may include a wireless controller application. The wireless controller application may be configured to interface between the NIC and an external Wi-Fi device. The wireless controller application may be configured to transmit data collected by the smart glasses over the wireless network.

The smart glasses may include an active near field communication ("NFC") reader configured to establish contactless communication with another device located within a predetermined proximity to the smart glasses device. In some embodiments, one smart glasses device may communicate with another smart glasses device using NFC technology.

The smart glasses may include an embedded subscriber identification module ("E-SIM") card. The E-SIM may enable the smart glasses to communicate and share data with another pair of smart glasses. The smart glasses may include one or more wired and/or wireless communication applications such as Bluetooth™. Smart glasses may utilize cellular technology or Wi-Fi to be operable as wearable computers running self-contained mobile applications.

The smart glasses may include a battery. The battery may be configured to power hardware components such as the microprocessor and the display. The battery may be rechargeable. The battery may be recharged via any suitable method. Illustrative charging methods include solar charging, wireless inductive charging, and connection via a charging port.

The smart glasses may include one or more cameras for capturing images and/or videos, one or more audio input devices, and one or more audio output devices.

Smart glasses inputs from a user may be hands-on. Smart glasses inputs from a user may be hands-free. In some embodiments, smart glasses inputs may involve a combination of hands-on and hands-free protocols.

In some embodiments, the smart glasses inputs may be hands-on. The smart glasses may require the use of touch buttons on the frame. In some embodiments, the user input may also be entered via a nano touch screen incorporated into the frame or lenses of the smart glasses. The nano touch screen may be a nano light emitting diode ("LED") touch screen. The nano touch screen may be a nano organic light emitting diode ("OLED") touch screen.

The touch screen may receive touch-based user input. As such, the nano LED touch screen may cover a portion of the frames and/or lenses of the smart glasses. Touch-based gestures may include swiping, tapping, squeezing and any other suitable touch-based gestures or combination of touch-based gestures.

In some embodiments, the smart glasses inputs may be hands-free. The smart glasses may receive hands-free input through voice commands, gesture recognition, eye tracking or any other suitable method. Gesture recognition may include air-based hand and/or body gestures. Air-based gestures may be performed without touching the smart glasses.

The smart glasses may include one or more sensors. Illustrative sensors may include a touch screen, camera, accelerometer, gyroscope and any other suitable sensors. The smart glasses sensors may detect hands-free input such as air gestures or eye movement.

The smart glasses may function as a node on an Internet of Things (IOT) network. An IOT may be defined as a pervasive and ubiquitous network that enables monitoring and control of the physical environment by collecting, processing, and analyzing the data generated by nodes (e.g., smart objects). The diverse nature and large volume of data collected by numerous interconnected nodes on an IoT potentially enables unique functionality and operational opportunities.

Each IOT node may represent an IOT device. Each node may include two or more nodes. A node may include a sensor. Sensors may include devices that detect changes in a physical or virtual environment. Sensors may include cameras for capturing images of the environment. For example, one or more cameras may be embedded or partially embedded in smart glasses.

Sensors may be any suitable size. For example, sensors may be a few millimeters in size. Sensors may be deployed in a wide variety of locations. Sensors may be relatively inexpensive and have low energy consumption. Sensors may "sense" two or more stimuli or environmental changes.

Captured data may be transmitted using any suitable transmission method. Captured data may be transmitted by the sensor and processed away from the location of the sensor that captured the data. For example, captured data may be transmitted from one node to another node until the captured data reaches a data repository.

Captured data may be transmitted to a location where information is needed for decisioning or consumption, which may not be the same place the data was captured or generated. Data synchronization protocols and caching techniques may be deployed to ensure availability of information at, or delivery to, a desired node. Captured data may be stored locally on the sensor for an amount of time prior to transmission or broadcast to another node.

In some embodiments, sensor data may be transmitted continuously. In some embodiments, sensor data may be transmitted on a periodic schedule. In some embodiments, sensor data may be transmitted in response to a change in conditions detected by the sensor.

The sensor data may be processed using edge computing. Edge computing is a distributed, open IT architecture that features decentralized processing power. Data may be processed by a local computer or server rather than being transmitted to a data center, reducing internet bandwidth usage.

The ATM and the smart glasses may function as edge nodes. Data obtained by the smart glasses and the ATM may be processed locally using edge computing. Edge computing enables real time processing of sensor data with reduced latency and allows the devices to immediately identify a fraud situation on-site. The IoT network may be a local edge network.

The system may include a local edge computing platform. The edge computing platform may communicate with the ATM, the smart glasses, and any other suitable device. The edge computing platform may send updates to other edge nodes and receive updates from other edge nodes. The edge computing platform may connect with an enterprise server. The edge computing platform may function as an edge gateway for connecting to the internet.

The edge computing platform may maintain profiles for each ATM. ATM profiles may include location, ATM images, and ATM fraud data. The ATM profiles may be updated on a periodic basis.

In some embodiments, ATM profile data from multiple ATMs or multiple edge platforms may be consolidated at an ATM cluster node. A cluster may include a set of ATMs in a defined geographic area. The cluster nodes may be nodes on the edge network.

The system may include an enterprise server. The enterprise server may include a fraud recognition engine. The fraud recognition engine may use one or more machine learning algorithms to generate a fraud detection model. Data used to train the model may include customer images captured by smart glasses, ATM images, ATM network fraud data, and fraud data reported by users. Data used to train the model may include ATM profile data. The fraud detection model may be retrained on a periodic basis or in response to data updates.

The fraud detection model may be a machine learning model. Machine learning models may be mathematical algorithms trained to make assumptions about input data. Using the assumptions, the machine learning model may approximate properties of the input information to calculate new properties or determine how to respond.

Deep learning is a subset of machine-learning. Deep learning classifiers are input during a training stage as labeled training data. Deep learning uses the classifiers to learn from the input data and uses the learned information to correctly classify unlabeled data during execution. A deep learning classifier creates, absent human interaction, a non-linear, multi-dimensional classification model based on the labeled-training data.

Deep learning classifiers typically utilize a layered structure of algorithms known as an artificial neural network ("ANN") to create the non-linear, multi-dimensional classification model. An ANN mimics the biological neural network of the human brain. The ANN is comprised of layers of neurons. Each neuron, included in each layer, takes one or more inputs and produces one output. The output is based on the values of the inputs as well as a weight associated with each inputted value. As such, one input can carry more weight than another input.

The machine learning framework may include a convolution neural network (CNN) that combines a joint feature extractor, classifier and regressor together in a unified framework.

A CNN is particularly suited for processing images because it convolves learned features with input data and uses two-dimensional convolutional layers for classification. A CNN typically begins with an input image and applies different filters to generate a feature map. Other layers apply functions to increase non-linearity, apply pooling, and input a pooled image vector into a fully connected artificial neural network. Images may iterate through the layers until a well-defined neural network with weights and feature detectors is established.

The enterprise server may periodically receive updated ATM data from the edge computing platform or from a cluster node. The update may be an updated ATM profile. The update may be transmitted on a daily, weekly, or monthly basis, or on any suitable schedule. The update may be transmitted in response to receipt of new ATM data at the edge computing platform or cluster node. The update may be transmitted in response to a request from the enterprise server. Updated ATM data may be used by the fraud recognition engine to retrain the fraud detection model.

The edge computing platform may receive a copy of the fraud detection model from the fraud recognition engine. The fraud recognition engine may periodically update the fraud detection model maintained at the edge computing platform. The update may be transmitted on a daily, weekly or monthly basis, or on any suitable schedule.

At an ATM, a user may connect to the enterprise network using smart glasses. In some embodiments, the smart glasses may be voice-enabled and the ATM may authenticate the user via voiceprint analysis or voice-based input of an authentication code. The ATM may authenticate the user via a touch-based input to the smart glasses, an air-based gesture, by any combination of voice, touch and air gestures, by iris recognition, or by any suitable method.

Following authentication of the smart glasses device, an ATM session may be initiated. In some embodiments, a user may communicate with the ATM via voice-based input to the smart glasses device.

Images of the ATM and the surrounding environment may be captured by the smart glasses camera and transmitted over a local network to the edge computing platform.

The edge computing platform may process the images and categorize the data. The edge computing platform may store image color, angle, direction, aspect ratio and any other relevant data in a dataset. One or more deep learning algorithms may be applied for image classification and/or object identification. In some embodiments, a CNN may be applied.

The edge computing platform may identify ATM fraud based on the image captured by the smart glasses. The image may be compared to ATM profile data. Machine learning algorithms may take image objects as input and process the images in real time. The edge computing platform may identify ATM fraud during a live interaction with a smart glasses wearer.

The system may identify ATM features in the smart glasses image. The system may compare the ATM features identified in the image to stored parameters for these features. Based on the comparison, the system may identify fraud. For example, an ATM card reader may be modified by a bad actor to skim data from cards entered at the machine. The modifications may not be apparent to the user, but based on the image captured by the smart glasses, the system may detect an anomaly. In another example, a bad actor may install a camera in the ATM environment to capture user PIN entry. The camera may be camouflaged to appear as part of the ATM and may not be apparent to the user. Based on the image captured by the smart glasses, the system may detect the camera and trigger a fraud alert.

The determination of fraud may be based on a percentage correlation between the image captured by the smart glasses and the ATM profile data. If the percentage correlation meets or exceeds a predetermined threshold, the system may determine that there is no detectable fraud. If the percentage correlation does not meet a predetermined threshold, this may indicate modifications to the ATM and trigger a determination of fraud.

The determination of fraud may be based on image data from the ATM profile. The determination of fraud may be based on fraud data or transaction data from the ATM profile. The determination of fraud may be based on user reported fraud data. The determination of fraud may combine image analysis with other ATM profile data and/or user reported data.

Edge processing enables real time communication with the smart glasses wearer at the ATM with reduced latency. The smart glasses may capture and transmit an image of the ATM environment and the edge platform may return a result before the user begins a transaction.

In some cases, the edge computing platform may determine that there is no fraud risk at the ATM. The edge computing device may communicate to the smart glasses that it is safe for the user to proceed with a transaction. An all-clear message may be communicated to the user as an audio message generated by the smart glasses. The all-clear message may be displayed to the user on the lenses of the smart glasses using an augmented reality display.

In other cases, the edge computing platform may determine that there is a fraud risk at the ATM. The edge computing device may communicate a fraud alert to the smart glasses. The fraud alert may be communicated to the user as an audio message generated by the smart glasses. The fraud alert may be displayed to the user on the lenses of the smart glasses using an augmented reality display.

In some embodiments, along with a fraud alert, the edge computing device may transmit directions to an alternate ATM location to the smart glasses. The directions may be communicated to the smart glasses user via audio, augmented reality display or via any suitable method. In some embodiments, the directions may be displayed on the ATM screen.

In response to a determination of fraud, the system may disable one or more ATM functions. In some embodiments, the edge computing platform may transmit instructions to the ATM to disable transaction capabilities. Other mitigation options may include powering down the ATM, displaying a warning on the ATM screen or locking an access card slot.

The edge computing platform may communicate a fraud alert to other smart glasses devices functioning as nodes on the IOT network. The smart glasses may communicate the information on a smart glasses display, via an audio alert, or by any suitable method. In some embodiments, one smart glasses node may share fraud information directly with other smart glasses nodes. Transmission over the local edge network may enable widespread fraud notification for smart glasses users that are not at the time engaged in a transaction.

The edge computing platform may transmit categorized image data to the fraud recognition engine for comparison with previously categorized data maintained on the enterprise server. The edge computing platform may transmit a determination of fraud to the enterprise server. Data from the edge computing platform may be used by the fraud recognition engine to update and retrain the fraud detection model.

One or more non-transitory computer-readable media storing computer-executable instructions are provided. When executed by a processor on a computer system, the instructions perform a method for real-time fraud screening via smart glasses interactions during an ATM session.

The method may include receiving a fraud detection model generated at an enterprise server, the model based on data from the ATM. The method may include receiving a request to initiate an ATM session from a smart glasses device and authenticating the smart glasses device.

The method may include receiving an image of the ATM environment captured by the smart glasses device during the ATM session and classifying the smart glasses image based on more image attributes. The fraud detection model may be applied to compare the image attributes from the smart glasses device to the data received from the ATM.

When the probability of correspondence between the image attributes and the data from the ATM meets or exceeds a predetermined threshold, the method may include transmitting an all-clear message to the smart glasses device.

When the probability of correspondence between the image attributes and the data from the ATM does not meet the predetermined threshold, the method may include transmitting a fraud alert to the smart glasses device and disabling one or more ATM functions.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative scenario 100. In scenario 100, smart glasses device 104 is used at ATM 102. Smart glasses device 104 may be authenticated for access to the ATM. Smart glasses device 104 may communicate directly with the ATM. In some embodiments, the user may enter a PIN or authentication code to authenticate smart glasses device 104. The PIN may be entered via smart glasses device 104 as a voice-based input, touch-based input, gesture-based input or as any combination of inputs. Following authentication of the smart glasses device, the device may capture an image of the ATM environment and transmit the image to an edge computing platform (not shown).

Figure 2:
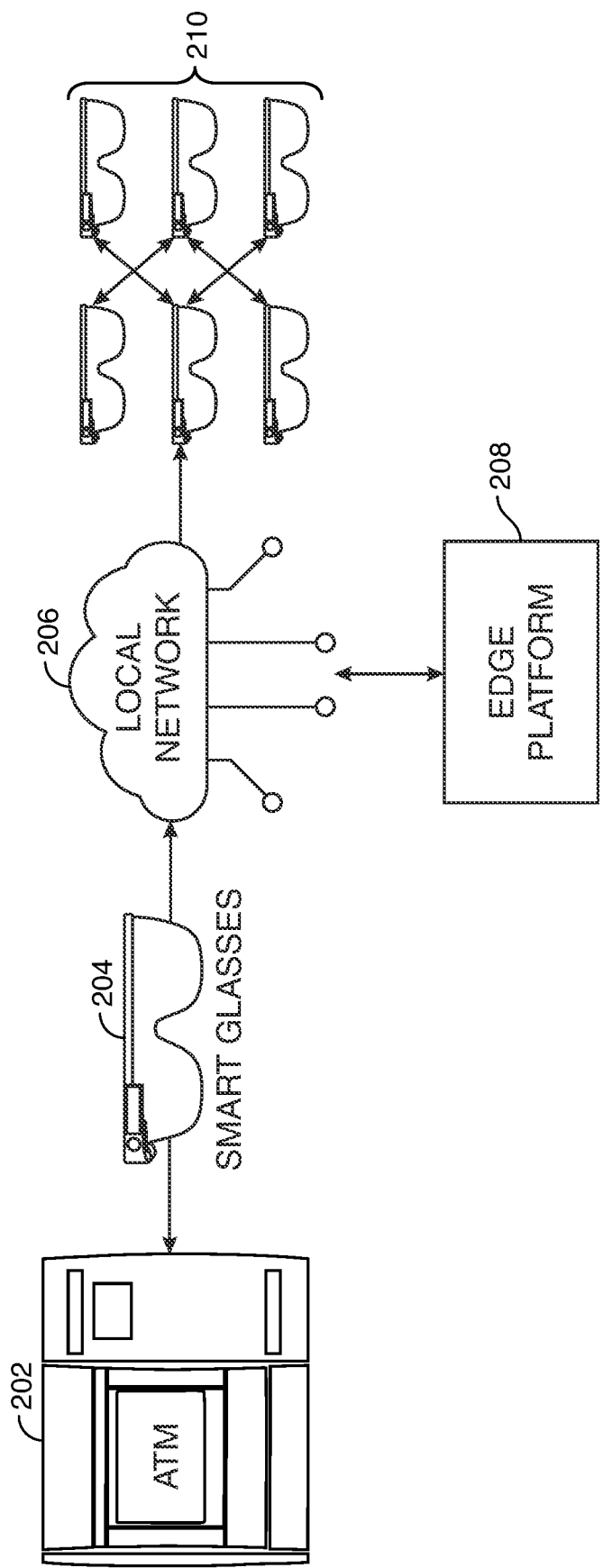
FIG. 2 shows illustrative apparatus and architecture in accordance with principles of the disclosure.

FIG. 2 shows illustrative architecture 200. Architecture 200 may include apparatus shown in scenario 100. Illustrative architecture 200 includes local edge network 206, which connects edge nodes 204 and 210 to edge platform 208. Edge platform 208 may connect to the internet (not shown).

Smart glasses device 204 may capture an image of ATM 202. Smart glasses device 204 may transmit the image via local network 206 to edge platform 208 for processing. In some embodiments, the edge network may be a wide area network (WAN) or any suitable network configuration. Edge platform 208 may determine that there is a likelihood of fraud at ATM 202. Edge platform 208 may transmit a fraud alert to smart glasses device 204. Edge platform 208 may transmit the fraud alert to smart glasses devices 210 which are not in use at the ATM. In some embodiments, smart glasses device 204 may communicate the fraud alert directly to smart glasses devices 210. The fraud alert may include directions to an alternate ATM location.

Figure 3:
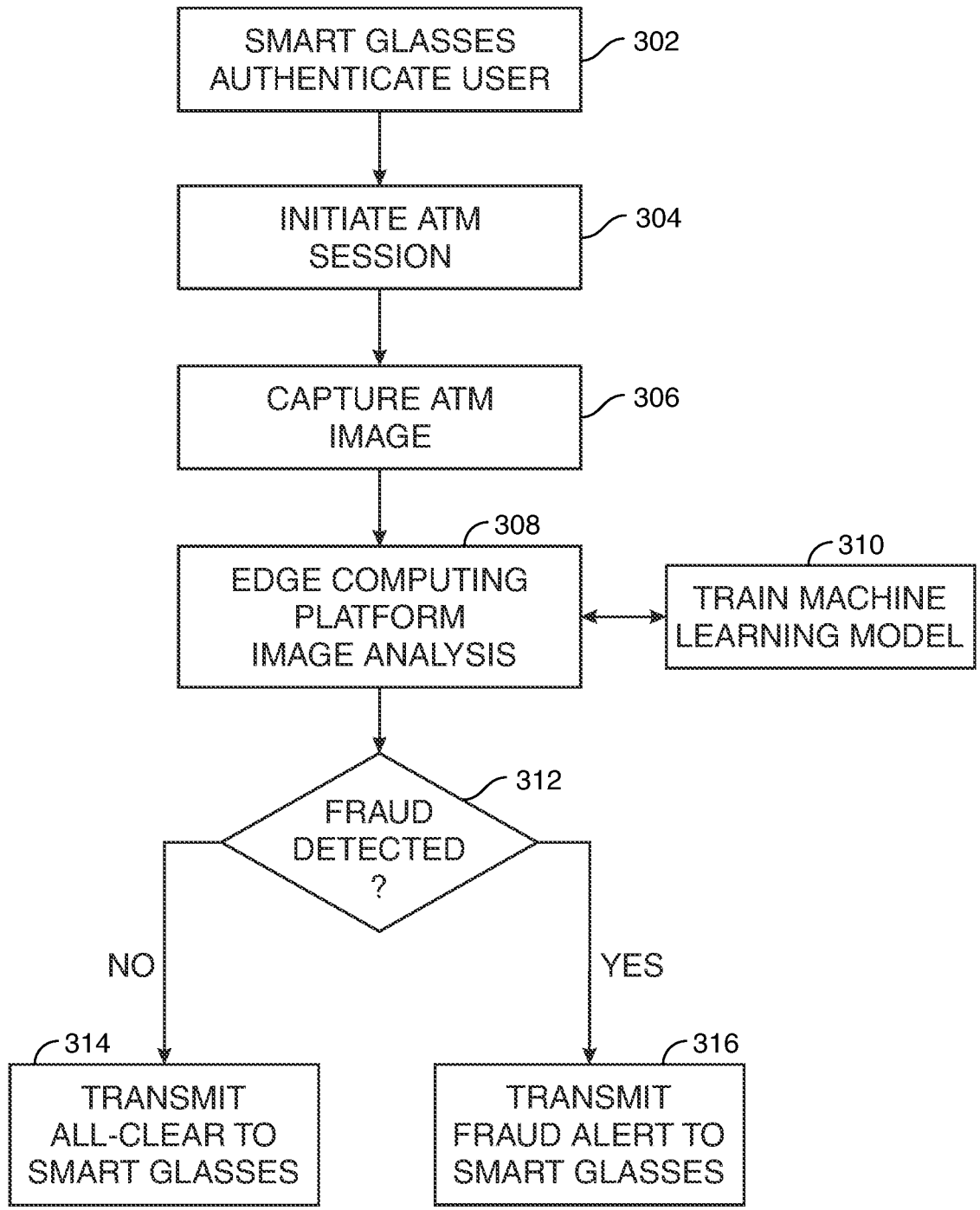
FIG. 3 shows an illustrative process flow in accordance with principles of the disclosure.

FIG. 3 shows illustrative process flow 300 for smart glasses based identification of ATM fraud. At step 302, the smart glasses device is authenticated to the ATM. At step 304, an ATM session is initiated. At step 306, the smart glasses device captures an image of the ATM environment.

At step 308, an edge computing platform analyzes the image. The image may be compared to stored ATM images. The platform may use one or more machine learning algorithms to classify and compare the image. At step 310, a fraud detection model may be generated and trained at the enterprise server and stored at the edge platform. The edge platform may transmit ATM data, smart glasses images, and fraud determinations for ongoing training of the model.

At step 312, the edge computing platform may determine, based on the captured image, whether there is a risk of fraud at the ATM. If fraud is not detected, at step 314, the edge computing platform may transmit an all-clear message to the smart glasses device. If fraud is detected, at step 316, the edge computing device may transmit a fraud alert to the smart glasses device.

Figure 4:
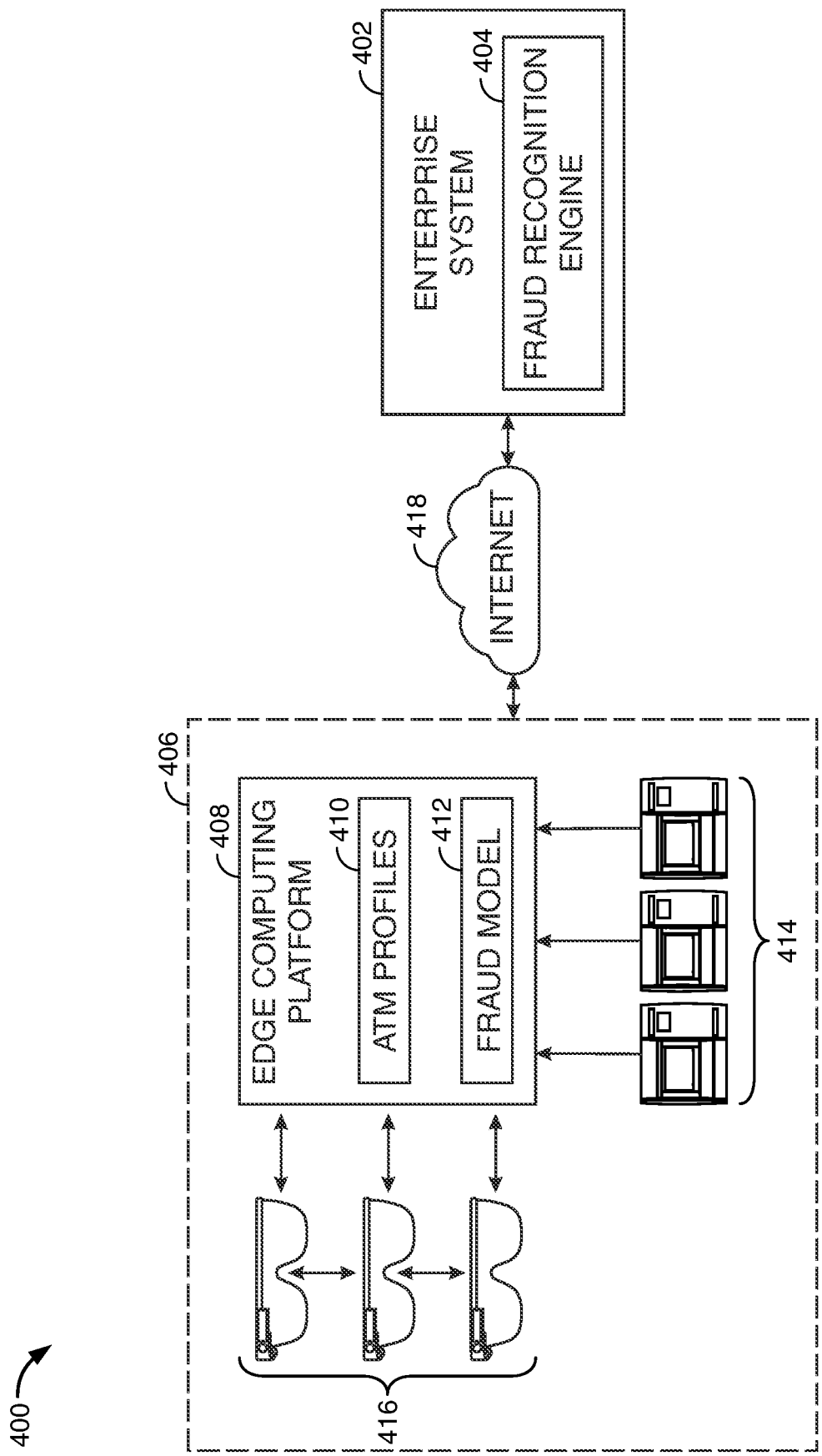
FIG. 4 shows illustrative architecture in accordance with principles of the disclosure.

FIG. 4 shows illustrative architecture 400. Architecture 400 includes edge network 406 (including elements 408-416) and enterprise system 402. Edge network 406 may use internet 418 to communicate with enterprise systems.

Enterprise system 402 may include fraud recognition engine 404. Fraud recognition engine 404 may train a machine learning model for fraud detection at an ATM. The fraud recognition engine may use data received from the edge network to train the machine learning model.

Edge network 406 may include edge computing platform 408. Edge network 406 may include edge nodes 416 and 414. The edge computing platform may store ATM data received from edge nodes 414. The edge computing platform may store a copy of the fraud detection model received from enterprise system 412.

Figure 5:
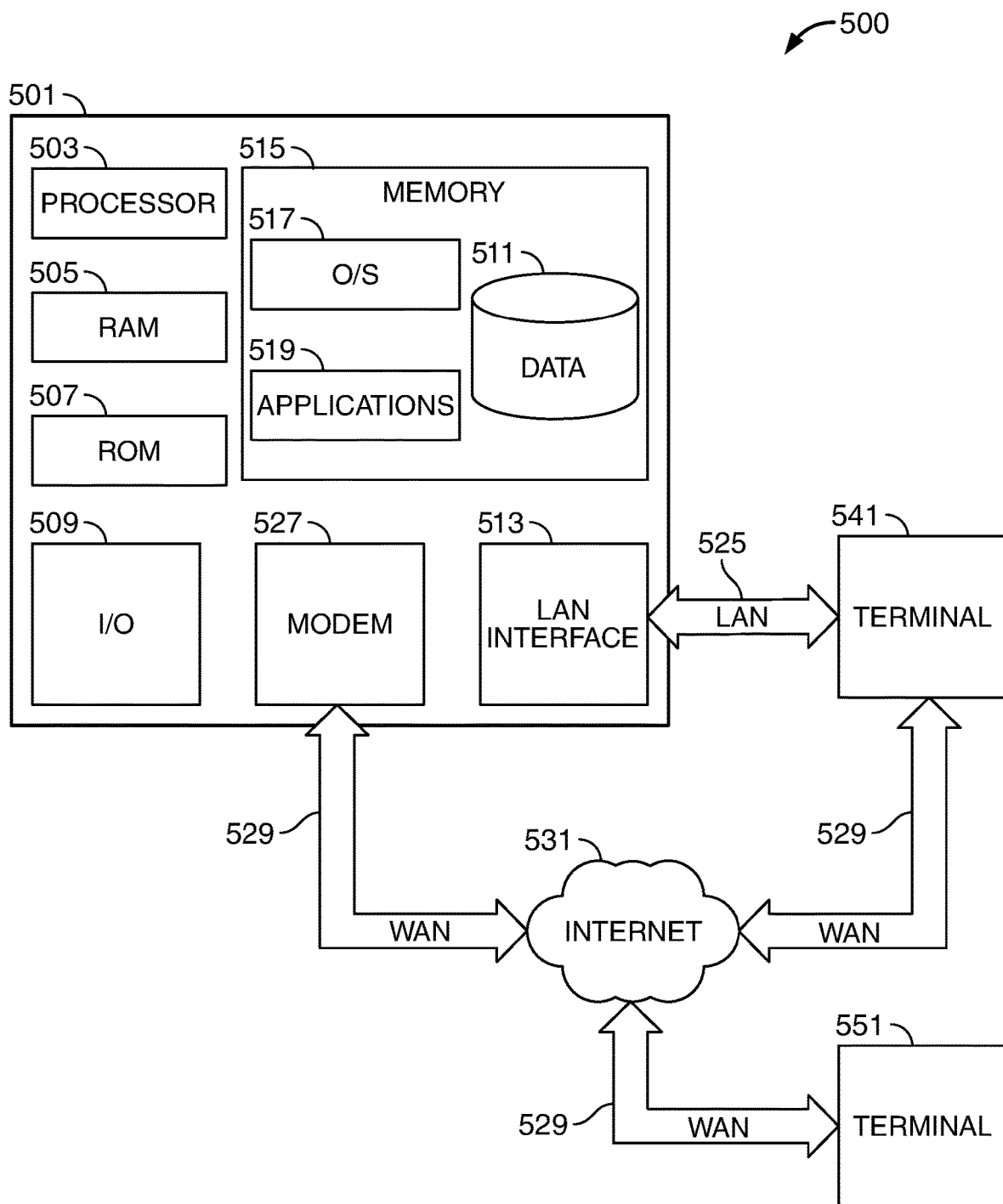
FIG. 5 shows illustrative apparatus in accordance with principles of the disclosure.

FIG. 5 is a block diagram that illustrates a computing device 501 (alternatively referred to herein as a "server or computer") that may be used in accordance with the principles of the invention. The computer server 501 may have a processor 503 for controlling overall operation of the server and its associated components, including RAM 505, ROM 507, input/output ("I/O") module 509, and memory 515.

I/O module 509 may include a microphone, keypad, touchscreen and/or stylus through which a user of device 501 may provide input, and may also include one or more of a speaker for providing audio output and a video display device for providing textual, audiovisual and/or graphical output. Software may be stored within memory 515 and/or other storage (not shown) to provide instructions to processor 503 for enabling server 501 to perform various functions. For example, memory 515 may store software used by server 501, such as an operating system 517, application programs 519, and an associated database.

Alternatively, some or all of computer executable instructions of server 501 may be embodied in hardware or firmware (not shown).

Server 501 may operate in a networked environment supporting connections to one or more remote computers, such as terminals 541 and 551. Terminals 541 and 551 may be personal computers or servers that include many or all of the elements described above relative to server 501. The network connections depicted in FIG. 1 include a local area network (LAN) 525 and a wide area network (WAN) 529, but may also include other networks.

When used in a LAN networking environment, computer 501 is connected to LAN 525 through a network interface or adapter 513.

When used in a WAN networking environment, server 501 may include a modem 527 or other means for establishing communications over WAN 529, such as Internet 531.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 519, which may be used by server 501, may include computer executable instructions for invoking user functionality related to communication, such as email, short message service (SMS), authentication services and voice input and speech recognition applications.

Computing device 501 and/or terminals 541 or 551 may also be mobile terminals including various other components, such as a battery, speaker, and antennas (not shown). Terminal 551 and/or terminal 541 may be portable devices such as a laptop, tablet, smartphone or any other suitable device for receiving, storing, transmitting and/or displaying relevant information.

Any information described above in connection with database 511, and any other suitable information, may be stored in memory 515. One or more of applications 519 may include one or more algorithms that encrypt information, process received executable instructions, interact with enterprise systems, perform power management routines or other suitable tasks. Algorithms may be used to perform the functions of one or more of generating an ATM profile, updating a fraud detection model, classifying an image, transmitting a fraud alert, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 6:
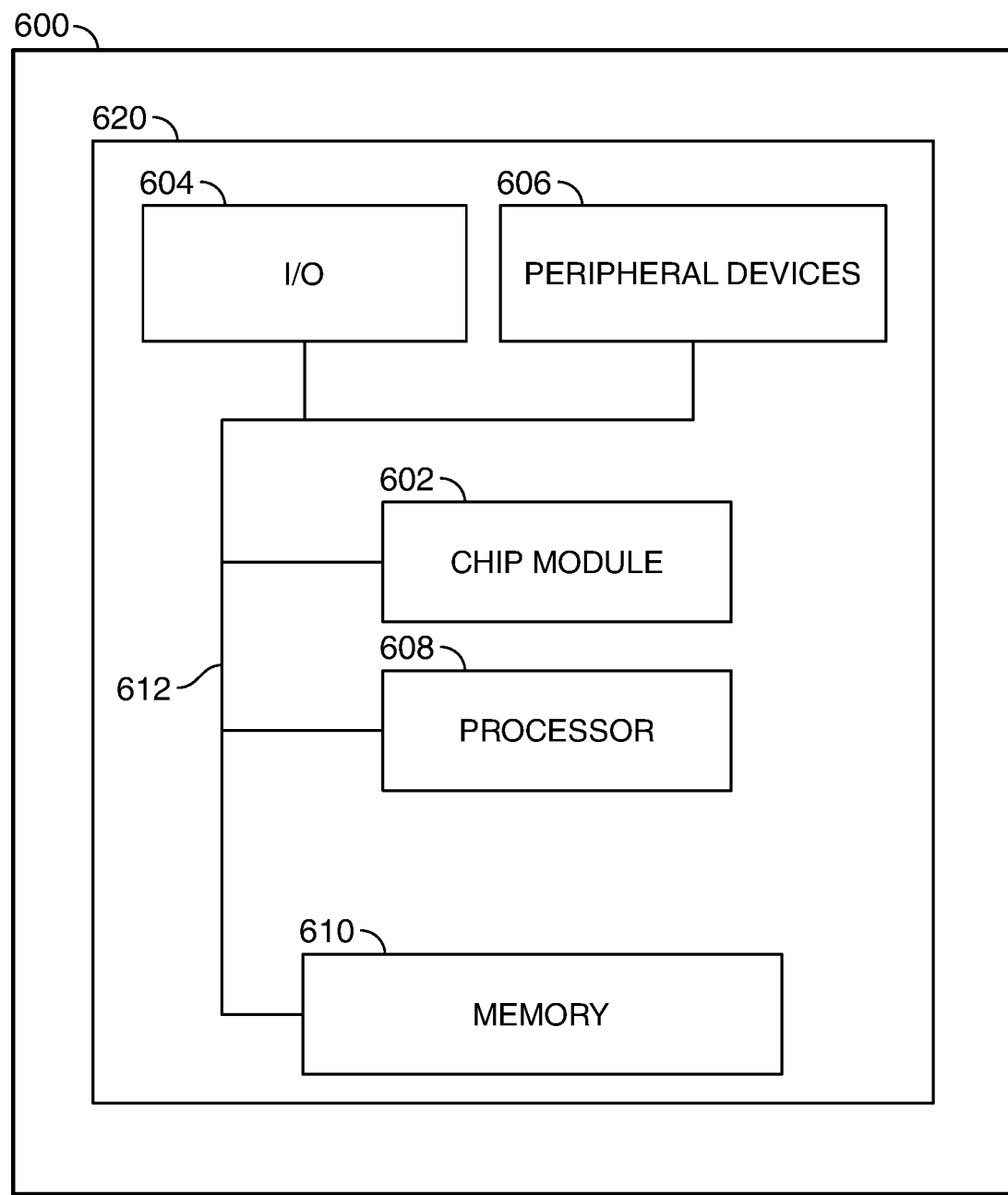
FIG. 6 shows illustrative apparatus in accordance with the principles of the disclosure.

FIG. 6 shows an illustrative apparatus 200 that may be configured in accordance with the principles of the invention.

Apparatus 600 may be a computing machine. Apparatus 600 may include one or more features of the apparatus that is shown in FIG. 5.

Apparatus 600 may include chip module 602, which may include one or more integrated circuits, and which may include logic configured to perform any other suitable logical operations.

Apparatus 600 may include one or more of the following components: I/O circuitry 604, which may include a transmitter device and a receiver device and may interface with fiber optic cable, coaxial cable, telephone lines, wireless devices, PHY layer hardware, a keypad/display control device or any other suitable encoded media or devices; peripheral devices 606, which may include counter timers, real-time timers, power-on reset generators or any other suitable peripheral devices; logical processing device 608, which may generate ATM profiles, train or update a fraud detection model, classify images, generate fraud alerts, and perform other methods described herein; and machine-readable memory 610.

Machine-readable memory 610 may be configured to store in machine-readable data structures: ATM profile data, one or more machine learning models, smart glasses images, fraud determinations, and any other suitable information or data structures.

Components 602, 604, 606, 608 and 610 may be coupled together by a system bus or other interconnections 612 and may be present on one or more circuit boards such as 620. In some embodiments, the components may be integrated into a single chip. The chip may be silicon-based.

Thus, methods and apparatus for SMART GLASSES BASED DETECTION OF ATM FRAUD are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for fraud screening via smart glasses interactions during an ATM session, the method comprising:
    receiving data from an ATM and storing the data in an ATM profile;
    receiving a request to initiate an ATM session from a smart glasses device and authenticating the smart glasses device to initiate the ATM session;
    receiving an image of the ATM environment captured by the smart glasses device during the ATM session;
    using a neural network, classifying the smart glasses image based on one or more extracted image attributes;
    comparing the one or more image attributes from the smart glasses image to the ATM profile;
    when a probability of correspondence between the image attributes from the smart glasses image and the ATM profile meets or exceeds a predetermined threshold, transmitting an all-clear message to the smart glasses device; and
    when the probability of correspondence between the image attributes from the smart glasses image and the ATM profile does not meet the predetermined threshold:
    transmitting a fraud alert to the smart glasses device; and
    disabling a transaction capability at the ATM;
wherein the smart glasses device comprises a voice controller, the method further comprising communicating the fraud alert to a smart glasses device user as an audio message.

2. The method of claim 1, wherein the ATM data comprises an ATM image, an ATM location, and ATM transaction data.

3. The method of claim 1, wherein:
    the ATM is a first edge node;
    the smart glasses device is a second edge node;
    the ATM data and the smart glasses image are transmitted to an edge computing platform using a local edge network; and
    the fraud alert is transmitted to the smart glasses device from the edge computing platform using the local edge network.

4. The method of claim 3, wherein the smart glasses device is configured to transmit the fraud alert to at least one other edge node via the local edge network, the at least one other edge node comprising another smart glasses device.

5. The method of claim 1, wherein the smart glasses device comprises a display controller, the method further comprising communicating the fraud alert to a smart glasses device user via a smart glasses augmented reality display.

6. The method of claim 3, further comprising periodically transmitting ATM data from the edge computing platform to a remote enterprise server.

7. The method of claim 6, further comprising:
    receiving a fraud recognition model from the remote enterprise server at the edge computing platform, the fraud recognition model based at least in part on the ATM data;
    storing the fraud recognition model at the edge computing platform; and
    using the fraud recognition model for classifying and comparing the smart glasses image.

8. The method of claim 7, further comprising periodically receiving an update to the fraud recognition model at the edge computing platform from the remote enterprise server.

9. The method of claim 1, further comprising, when the probability of correspondence between the image attributes and the ATM profile does not meet the predetermined threshold, transmitting travel directions to an alternate ATM location to the smart glasses device.

10. One or more non-transitory computer-readable media storing computer-executable instructions which, when executed by a processor on a computer system, perform a method for real-time fraud screening via smart glasses interactions during an ATM session, the method comprising:
    receiving a fraud detection model generated at an enterprise server, the model based at least in part on data from the ATM;
    receiving a request to initiate an ATM session from a smart glasses device and authenticating the smart glasses device;
    receiving an image of the ATM environment captured by the smart glasses device during the ATM session;
    using a neural network, classifying the smart glasses image based on one or more extracted image attributes;
    using the fraud detection model, comparing the image attributes from the smart glasses image to the data from the ATM;
    when a probability of correspondence between the image attributes and the data from the ATM meets or exceeds a predetermined threshold, transmitting an all-clear message to the smart glasses device; and
    when the probability of correspondence between the image attributes and the data from the ATM does not meet the predetermined threshold:
    transmitting a fraud alert to the smart glasses device;
    disabling one or more ATM functions;
wherein:
    a request from a smart glasses device user to initiate the ATM session is a voice-based request; and
    the fraud alert is communicated to the smart glasses device user as an audio message.

11. The media of claim 10, wherein:
the ATM is a first edge node;
the smart glasses device is a second edge node;
the ATM data and the smart glasses image are transmitted to an edge gateway using a local edge network; and
the fraud alert is transmitted to the smart glasses device from the edge gateway using the local edge network.

12. The media of claim 11, further comprising periodically transmitting ATM data from the edge gateway to the enterprise server.

13. The media of claim 10, further comprising periodically receiving an update to the fraud detection model from the enterprise server.

14. The media of claim 10, wherein the data from the ATM comprises an ATM image, an ATM location, and ATM transaction data.

15. The media of claim 11, wherein the smart glasses device is configured to communicate the fraud alert to at least one other edge node using the local edge network, the at least one other edge node comprising another smart glasses device.

16. A system for fraud screening via smart glasses interactions during an ATM session, the system comprising:
a first edge node comprising an ATM;
a second edge node comprising a smart glasses device;
a third edge node comprising an edge platform, the third edge node configured to:
receive ATM data from the first edge node;
generate an ATM profile based at least in part on the ATM data and transmit the ATM profile to an enterprise server;
receive a machine learning model generated by the enterprise server, the model based at least in part on the ATM profile;
receive an image of the ATM environment captured by the smart glasses device during an ATM session and, using a neural network, classify the image based on one or more extracted image parameters;
input image classification data to the machine learning model;
in response to a determination that a probability of correspondence between the image classification data and the ATM profile meets or exceeds a predetermined threshold, transmit an all-clear message to the smart glasses device; and
in response to a determination that the probability of correspondence between the image classification data and the ATM profile does not meet the predetermined threshold:
transmit a fraud alert to the smart glasses device; and
transmit instructions to disable one or more ATM functions;
wherein the smart glasses device comprises a voice controller, the system further configured to communicate the fraud alert to a smart glasses device user as an audio message.

17. The system of claim 16, wherein, in response to a determination that the probability of correspondence between the image classification data and the ATM profile does not meet the predetermined threshold, the edge platform is configured to transmit travel directions to an alternate ATM location to the smart glasses device.

18. The system of claim 16, wherein the ATM profile comprises an ATM image, an ATM location, and ATM transaction data.

* * * * *